Aug. 2, 1966  M. FISCHER  3,263,552

COTTER

Filed Sept. 17, 1965

INVENTOR
Max Fischer

BY Stevens, Davis, Miller & Mosher
ATTORNEYS

United States Patent Office 3,263,552
Patented August 2, 1966

3,263,552
COTTER
Max Fischer, Hanfrose 3, Zurich, Switzerland
Filed Sept. 17, 1965, Ser. No. 488,199
Claims priority, application Switzerland, Nov. 10, 1961, 13,118/61
5 Claims. (Cl. 85—8.3)

The present application is a continuation-in-part of my earlier application Serial No. 235,907, filed November 2, 1962, now abandoned.

Cotters in the form of split pins are used for holding and securing in place bolts, pins, shafts, machine parts and the like. Such split pins are inserted up to their head portions in a hole through the element to be secured, either by hand or by means of a hammer, whereupon the two ends opposite to the head portions are spread apart and turned outwards with aid of a tool so as to prevent any unintentional release. Such split pins have the disadvantage, especially when required for a more robust execution, that they cannot be fitted and removed without the help of tools, which is tiresome and time consuming, in particular in places of difficult access, and which may give rise to injuries to the fitter.

In addition, split pin connections often have the disadvantage that between the split pin and the adjacent machine part, there is a larger or smaller clearance so that for example the pin to be secured can move to and fro axially owing to vibrations and thus become worn prematurely and cause rattling noises which, particularly in motor vehicles, are very distracting.

So far, various proposals have been made for cotters which eliminate the disadvantage of split pins. Most of these proposed designs, however, have not altogether proved practical as either they are relatively expensive to manufacture or are not sufficiently reliable in use.

Furthermore, many of these parts are not sufficiently resistant to heavy axial thrust or, when used on moving machine parts or vehicles, they give rise to damage, vibration, and rattling noises similar to split pins.

The problem therefore has been to provide a cotter for bolts, pins, shafts, machine parts and the like meeting the requirements of practical operation.

Very stringent requirements are demanded of cotters and the like by modern industry, in particular by the automobile industry, aircraft construction as well as by general machine, apparatus and instrument manufacture. Such cotters must particularly meet the following main requirements. The cotters must—

(1) Be capable of being fitted quickly, reliably and, if possible, without the need for tools in a single operation, even by unskilled labor and even in places of difficult access;

(2) Ensure perfect fit even with considerable variations in the dimensions of the parts to be secured;

(3) Be capable of equalizing a relatively large axial clearance and at the same time securing the part perfectly;

(4) Prevent the occurrence of rattling noises; and (5) Be of compact and simple design, require little space and be cheap to manufacture.

An object of the present invention is to provide a cotter which can meet these requirements. The invention relates to a cotter for bolts, pins, shafts, machine parts and the like comprising a locking part attachable to bolts and the like to be secured and a securing part joined to said locking part. The inventive cotter is characterized by the fact that the securing part, surrounding the member to be secured, is loop-shaped and has at least two bends lying opposite each other and directed toward the element to be secured. The apexes of said bends project rearwards of the lock part. The whole cotter is adapted in such a way that, when the locking part is inserted, the securing part positively slides over the circumference of the bolt or the like and automatically moves into the securing position and thereby causes equalization of the clearance between locking part and machine part.

Several embodiments of the present invention are shown in the accompanying drawings in which—

Figure 1:
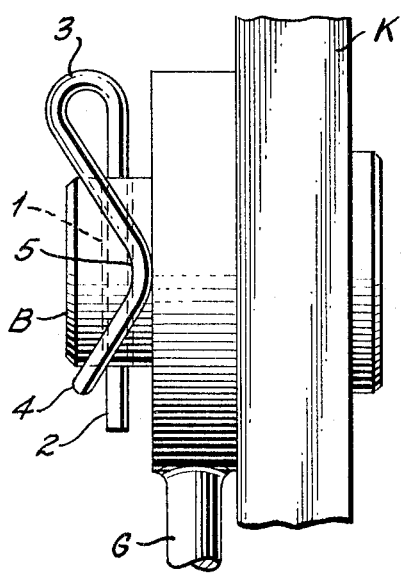
FIG. 1 is a side view of the cotter according to a first embodiment.
Figure 2:
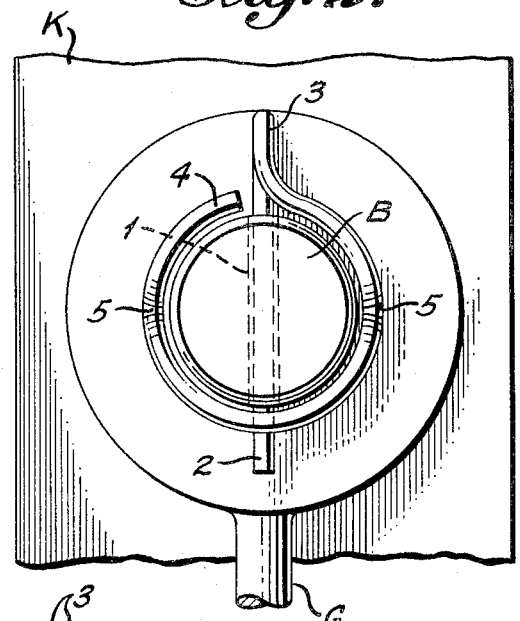
FIG. 2 is a front view of the cotter shown in FIG. 1.

In the embodiment according to FIGS. 1 and 2 of the drawing, the reference letter B designates a threadless bolt, for example, a bolt to be secured, engaging in a machine (shown in part) with element K connected to one end of a linkage G, for example, for limited rotary motion. Close to its free end, the bolt is provided with a through hole 1 to receive the locking part 2 of the cotter which may, for example, be formed of round steel wire. The top end of the locking portion 2 is bent back at 3 and is connected with the securing portion 4 of loop shape. The locking part is disposed at right angles to the securing portion 4, as is shown in FIG. 2, and surrounds the bolt in the locking position. In the embodiment shown, the securing portion is provided with two bends 5 lying opposite each other and directed towards the element G to be secured. The apexes of the bends project rearwards of the locking portion 2 and resiliently effect equalization of the clearance between linkage G and locking portion 2.

Fitting the cotter described above is done in a quick and reliable single operation without the use of a tool, by gripping the cotter with one hand by the resilient spacer 3 and inserting the locking portion 2 into the through hole 1 provided in bolt B. The securing portion 4 will positively slide over the circumference of bolt B and automatically move into the securing position thus holding the locking portion 2 in the locking position and thereby securing it against unintentional release.

As is shown in FIG. 1 of the drawing, the apexes of the bends 5 bear against the linkage G in the locking position because they project beyond the locking portion 2 by a certain amount and thus automatically resiliently equalize the greater or smaller clearance present between locking portion 2 and linkage G. This serves to effectively dampen vibrations and tends to prevent vibration damages and rattling noises owing to too great an axial clearance of bolt B.

If the above-described cotter is to be removed from the bolt, then the securing portion 4 is raised until it is no longer in its securing position, i.e., no longer surrounds bolt B, whereupon the cotter can be withdrawn radially from the bolt with little effort. The securing portion 4 again snaps back into its initial position after removal and the cotter is again ready for further use. Therefore, the cotter can be used many times.

Figure 3:
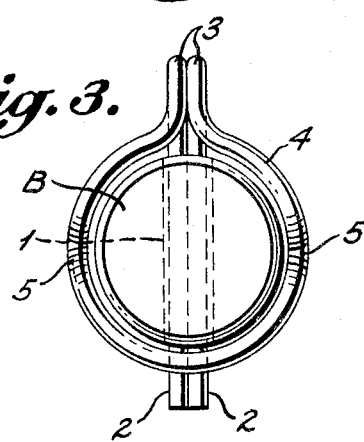
FIG. 3 is a front view of the cotter according to a second embodiment.

The cotter according to the embodiment illustrated in FIG. 3 differs from the one according to FIGS. 1 and 2 in that the locking portion 2 consists of two limbs. This embodiment of the cotter is particularly suitable for those cases in which the cotter is subjected to heavy axial thrusts.

Fitting and removing the cotter according to the lastdescribed embodiment is effected in the same manner as with the first-described embodiment.

Figure 4:
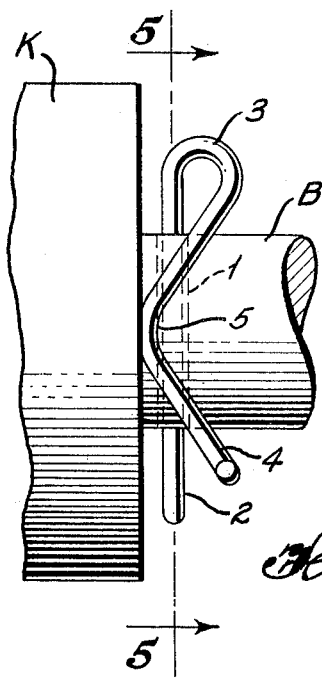
FIG. 4 is a side elevation of the cotter according to a third embodiment.
Figure 5:
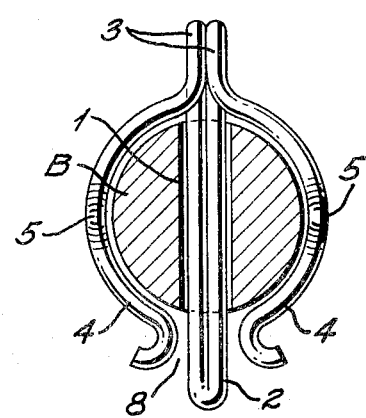
FIG. 5 is a vertical transerse section taken along line 5—5 of FIG. 4.

The cotter according to the embodiment illustrated in FIGS. 4 and 5 differs from the one shown in FIG. 3 in that the double-limbed locking portion 2 is closed at its bottom end and the securing portion 4 is provided with a cross-cranked loop 8 open at the bottom. The loop is capable of surrounding bolts of various diameters and to secure them with radial and axial initial tension. Fitting the cotter to bolt B is effected in the same manner as with the first-described embodiment. The cotter can be removed from the bolt by pulling it in the radial direction.

What is claimed is:

1. A one-piece cotter adapted to secure a plurality of machine elements to each other comprising a substantially straight locking portion to be passed through a hole in one of said machine elements, a substantially circular securing portion defining a pair of diametrically opposed bends, and a resilient connecting portion defining a loop connected at one end perpendicular to a point on said securing portion intermediate said bends and at its other end to one end of said locking portion to position said locking portion in the diametral plane of said securing portion including said point, said point and a second point diametrically opposed on the securing portion being spaced from said locking portion in one direction and said bends extending toward said locking portion with the apexes of said bends projecting beyond said locking portion in the opposite direction, whereby when said locking portion is inserted the securing portion positively slides over the circumference of the one machine element and moves into a securing position wherein the clearance between the locking portion and machine element is equalized.

2. A cotter according to claim 1 wherein said locking portion and said resilient connection portion are each formed of a double wire, and said securing portion is formed as a continuous circle attached to said connecting portion.

3. A cotter according to claim 1 wherein the portions are formed of a single wire folded against itself to form the locking and connecting portions with the ends of said wire being formed into two inwardly directed semi-circular portions cooperating to form the securing portion.

4. A cotter according to claim 1 wherein all portions are formed of a single wire.

5. A cotter according to claim 3 wherein each said semi-circular portion terminates in an outwardly directed semi-circular end.

References Cited by the Examiner
UNITED STATES PATENTS

| | | | |
|---|---|---|---|
| 1,190,908 | 7/1916 | Kafader | 85—8.3 |
| 2,589,482 | 3/1952 | Downey | 85—8.3 |
| 2,619,855 | 12/1952 | Williams | 85—8.3 |

EDWARD C. ALLEN, *Primary Examiner.*

R. S. BRITTS, *Assistant Examiner.*